May 28, 1963

J. F. WALL 3,091,176

PLASTIC PRINTING PLATES

Filed Aug. 18, 1960

INVENTOR.
JAMES F. WALL.

BY

Louis V. Lucia

ATTORNEY.

United States Patent Office 3,091,176
Patented May 28, 1963

3,091,176
PLASTIC PRINTING PLATES

James F. Wall, 614 Wolcott Hill Road, Wethersfield, Conn.
Filed Aug. 18, 1960, Ser. No. 50,456
2 Claims. (Cl. 101—395)

This invention relates to plastic printing plates and particularly to plastic printing plates, patterns or molds which include a reinforcing plate consisting of a sheet of aluminum or other suitable metal that is perforated in order that it may be securely imbedded in the plastic material forming the body of the printing plate.

Such printing plates are usually produced from a pattern or negative by placing thereon a thermo-plastic or thermo-setting material which may be either in powder, granular or sheet form. The reinforcing plate is placed over said material and heat and pressure are applied to force said material against the pattern and into the holes of the reinforcing plate thereby making said reinforcing plate an integral part of the printing plate.

It has been found that some types of thermo-plastic or thermo-setting materials have a tendency to shrink in proportion to their thickness as they cool after being heated and compressed and that those portions of the plastic material in line with the holes in the reinforcing plate, being thicker, shrink more than the portions between said holes. This uneven shrinkage causes the formation of cavities in the surfaces of the printing plate over the holes in the reinforcing plate which greatly impairs the smoothness and quality of the printing surfaces and frequently results in the rejection of many plastic printing plates as being useless. It is also believed that such cavities might result from the unequal expansion of the plastic material when it is removed from the press after being compressed. Those portions in line with the holes in the reinforcing plate would not be compressed as much as the portions between said holes and therefore would not expand as much when the pressure was released.

It is an object of this invention, therefore, to provide a novel construction for such printing plates which prevents formation of cavities or other deformities in the printing surface thereof.

Further objects and advantages of this invention will be more clearly understood from the following description and the accompanying drawings in which.

Figure 7:
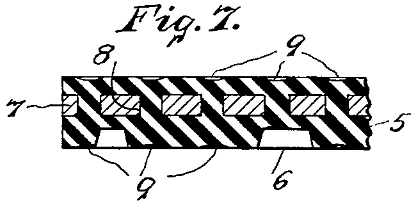
FIG. 7 is a sectional side view of a completed printing plate of conventional construction.

As illustrated in FIG. 7, conventional plastic printing plates made as above described comprise a body portion 5 which is generally made from a thermo-plastic material and is provided with a printing surface 6. In order to reinforce and prevent distortion of such printing plates, they are provided with a reinforcing plate 7 which is usually a perforated sheet of metal, such as aluminum, having holes 8 therethrough and which is imbedded in the said body 5. Since it is necessary that such reinforcing plates be of substantial thickness in order to sufficiently reinforce and stiffen the printing plate, and it is extremely difficult to economically perforate said reinforcing plate with holes that are of a smaller diameter than its thickness, the size of said holes 8 is determined by the thickness of the plate and is therefore quite large. In such conventional plastic printing plates, there is a tendency for cavities, such as indicated at 9, to appear in the surfaces of the printing plate in axial alignment with each hole in the reinforcing plate. The presence of such cavities in the printing surface 6 of the printing plate is extremely objectionable since they greatly impair the quality of the printing surface.

As explained above, the cavities 9 are believed to be caused by the uneven shrinkage or expansion of the plastic material after having been heated and compressed into the holes 8 of the reinforcing plate. It is assumed that the degree of such shrinkage or expansion is dependent upon the thickness of the printing plate, and that those portions thereof in line with the holes 8, being thicker, will naturally shrink or expand to a different degree than the other portions.

Figure 1:
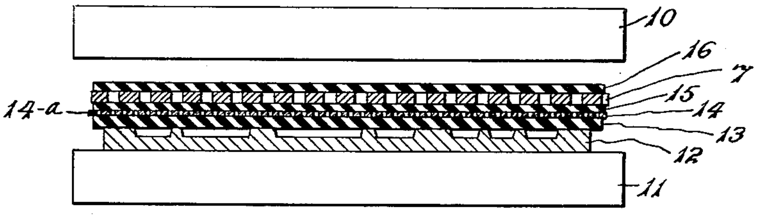
FIG. 1 is a sectional front view illustrating a step in the production of a plastic printing plate of my improved construction.
Figure 2:
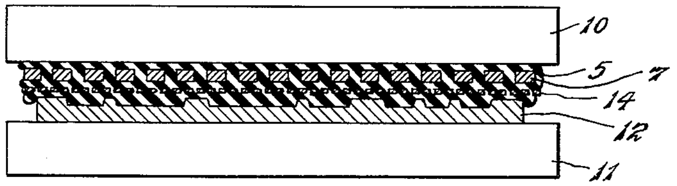
FIG. 2 is a similar view showing a further step in said production.
Figure 3:
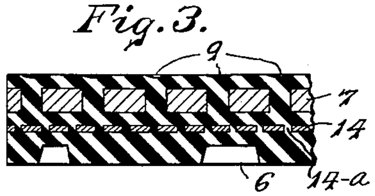
FIG. 3 is a sectional side view of said printing plate in completed form.

Referring now to FIGS. 1 to 3 of the drawing, wherein I have shown a preferred embodiment of my invention, the numerals 10 and 11 denote, respectively, the upper and lower pressure plates of a conventional press such as commonly used for producing plastic printing plates; said plates 10 and 11 being heated by suitable means not shown.

In forming a plastic printing plate of my invention, a pattern 12 is placed upon the lower plate 11; upon said pattern there are placed, in succession, a layer or sheet 13 of plastic molding material; a relatively thin, perforated, metal plate 14 having holes 14–*a* therein of a relatively small diameter; a second layer or sheet 15 of plastic material; a relatively thick reinforcing plate 7 of perforated metal and a third layer or sheet 16 of plastic material. These elements are then heated and compressed between the heated plates 10 and 11, as shown in FIG. 2, to force the plastic molding material into the typeface of the pattern 12 and into the holes in the plates 7 and 14 and to fuse said material into an integral mass forming a completed printing plate having imbedded therein the reinforcing plate 7 and the plate 14 as shown in FIG. 3.

As the printing plate cools after being removed from between the heated press plates 10 and 11, it will shrink or expand slightly in proportion to its thickness. However, since the holes 14–*a* in the plate 14 are of a small diameter and are not in direct alignment with the holes 8 in the plate 7, the cavities 9 form only on the upper surface of the printing plate in line with holes 8 in said reinforcing plate 7, which holes are of a relatively large diameter due to the fact that the said reinforcing plate 7 is quite thick in order to provide the desired regidity in the printing plate. The perforated plate 14 which is disposed between the reinforcing plate 7 and the printing surface 6 of the printing plate is much thinner than the reinforcing plate 7 so that the holes 14–*a* in said plate 14 are easily made of a much smaller diameter than the holes 8. The said perforated plate 14 will therefore provide what may be called a "barrier" which will prevent irregular shrinking or expansion of the plastic material at the bottom of the plate and will thereby prevent the formation of cavities on said printing surface as clearly illustrated in FIG. 3.

I have found that very satisfactory results are obtained when the holes in the barrier plate 14 are from .005 to .025 in diameter and the diameter of the holes in the reinforcing plate 7 is approximately .080 due to the thickness required of said reinforcing plate for sufficiency stiffening the printing plate.

Figures 5, 6:
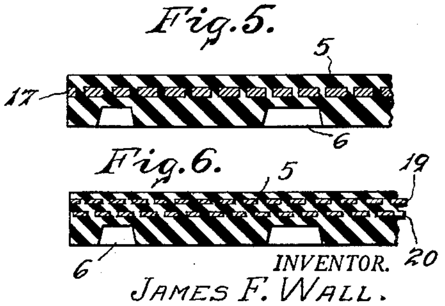
FIG. 5 is a similar view showing another modification of a printing plate embodying the present invention.
FIG. 6 is a similar view showing a further modified construction.

My invention may also be embodied in a plastic printing plate of the construction shown in FIG. 5 wherein a reinforcing plate 17 of a desired thickness is provided with perforations which are small enough to prevent the formation of cavities on either side of the printing plate. It has been found, however, that if the diameter of the holes in said reinforcing plate 17 is less than its thickness it is very expensive to produce since it has to be made by a costly method. It is therefore highly advantageous and much more economical to provide a relatively thick reinforcing plate and a relatively thin barrier plate, such as 14, to serve as a barrier against the shrinking or expansion of the plastic material in line with the larger holes 8 in the reinforcing plate 7.

Figure 4:
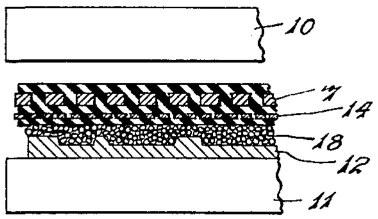
FIG. 4 is a view similar to FIG. 1, but showing a modified form of construction.

In the modified form of printing plate shown in FIG. 4, the body thereof may be constructed from a preformed plate having the reinforcing plate 7 and the barrier plate 14 imbedded therein. This preformed plate is placed upon a layer of granulated or powdered plastic material 18 which is spread over the surface of the pattern 12 and is positioned so that the barrier plate is disposed between the reinforcing plate 7 and the said material 18. The preformed plate and the material 18 are then heated and compressed to fuse them together to produce a printing plate of the same construction as shown in FIG. 3.

My invention also contemplates a plastic printing plate of the type shown in FIG. 6 which may include two or more thin, perforated plates 19 and 20 having holes of sufficiently small diameter to prevent the formation of cavities on the surface of the printing plate. These thin plates 19 and 20, being spaced, but connected by the plastic material, will provide a truss effect which will reinforce the printing plate to the same or a greater extent than a single reinforcing plate of the total thickness.

I claim:

1. A printing plate having a printing surface at one side thereof and comprising a body of plastic material having imbedded therein a perforated reinforcing plate with holes therethrough at least as large as the thickness of said reinforcing plate, and a perforated barrier plate between said reinforcing plate and printing surface, said barrier plate being of a lesser thickness than the reinforcing plate and having holes therethrough substantially smaller than the holes of said reinforcing plate.

2. In a printing plate comprising a body of plastic material having a printing surface upon one side thereof, the combination of a reinforcing plate having holes therethrough and imbedded in said body, and a barrier plate imbedded in said body between said reinforcing plate and printing surface, said barrier plate being substantially thinner than said reinforcing plate and having holes therethrough substantially smaller than the holes of the reinforcing plate.

References Cited in the file of this patent

UNITED STATES PATENTS

| | | |
|---|---|---|
| 1,377,514 | Novotny | May 10, 1921 |
| 1,379,432 | Yeoell | May 24, 1921 |
| 1,589,665 | Schmutz | June 22, 1926 |
| 1,871,568 | Swan et al. | Aug. 16, 1932 |
| 2,218,351 | Crowell | Oct. 15, 1940 |
| 2,272,254 | Swan | Feb. 10, 1942 |
| 2,833,009 | Horst | May 6, 1958 |
| 3,031,959 | Libberton | May 1, 1962 |

FOREIGN PATENTS

| | | |
|---|---|---|
| 5,324 | Great Britain | 1899 |